United States Patent Office 3,106,477
Patented Oct. 8, 1963

3,106,477
SUCROSE ESTER OF 2,2,4-TRIMETHYL-3-OXO-VALERIC ACID AS AN EXTENDER
William E. Wright and Charles H. Coney, Kingsport, Tenn., assignors to Eastman Kodak Company, Rochester, N.Y., a corporation of New Jersey
No Drawing. Filed Dec. 14, 1960, Ser. No. 75,657
4 Claims. (Cl. 106—169)

This invention concerns the use of the sucrose ester of 2,2,4-trimethyl-3-oxovaleric acid as an extender for cellulose esters.

Various plasticizers and resins have been suggested for mixing with cellulose esters to modify the properties of the resulting composition. Ordinarily, when a modifier is added to a coating composition such as a lacquer, the modifier either affects the viscosity of the coating composition or causes a softening of the resulting dry film.

Therefore, cellulose esters which are not plasticized form hard, brittle cast films and molded articles. Cellulose esters which are used for molding purposes are often modified by adding plasticizers or the like which improve the molding characteristics. For instance, when cellulose esters are used in injection molding machines and extruders, the stringent requirements for moldability have limited the formulations which can be supplied. For instance, it is often necessary to force the molten material into small spaces such as holes or crevices. In order to accomplish this, plasticizers are added to the cellulose ester powder and formed into pellets which are supplied commercially. The resulting cellulose ester can then be molded or extruded to obtain the desired detail from the mold. However, softer materials may be used than the resulting product warrants. Thus, the material which is soft and which has a softer flow designation results in a final product whose physical properties such as surface hardness, mechanical properties, and dimensional stability are unsatisfactory.

In addition to the problem of preserving the hardness, mechanical properties, and dimensional stability of the finished product, difficulty has been experienced in obtaining suitable plasticizers. If a plasticizer is not completely compatible in the proportions generally used with a cellulose ester, the plasticizer will exude from the film or molded piece giving generally an opaque appearance and oily film. In the case of low boiling plasticizers, the material boils off at temperatures to which the cellulose ester is subjected either in preparation or use. Other plasticizers have their own characteristic defect such as water solubility, subjection to mildew type of fungus attack, poor light stability, or the like.

It has been desirable to find a plasticizer which would have good plasticizing qualities during the molding or extruding operation and which could be added to film-forming lacquers but which would not be detrimental to the properties desired in the final product such as hardness, and the like. We have found that the sucrose ester of 2,2,4-trimethyl-3-oxovaleric acid has unusually good plasticizing qualities and at the same time can be used as an extender as well as a plasticizer.

One object of this invention is to provide a plasticized cellulose ester which has desirable flow characteristics during molding and extruding operations. A further object is to provide a plasticizer which will be relatively insensitive to water attack, which has good compatibility, and which can be used as an extender for cellulose esters. A further object is to provide an extender for film-forming lacquers which will not appreciably affect the viscosity or the properties of the final film. A further object is to provide a method of plasticizing cellulose esters so that they can be used in commercially available injection molding and extrusion equipment wtihout detrimentally affecting the final product's characteristics.

In carrying out our invention, we use the sucrose ester of 2,2,4-trimethyl-3-oxovaleric acid, herein referred to as STMOV. We have found that the preferred sucrose ester has complete substitution. However, the hexa-ester may be used in place of the octa-ester. The mixed sucrose ester of acetic acid and 2,2,4-trimethyl-3-oxovaleric acid may also be used providing it has one to three degrees of substitution with acetic acid.

We have found that compositions comprising a mixture of 1–80% sucrose ester of 2,2,4-trimethyl-3-oxovaleric acid and 99–20% cellulose ester are useful for extrusion, molding or lacquer applications. Compositions comprising a mixture of 1–28% sucrose ester of 2,2,4-trimethyl-3-oxovaleric acid and 99–72% cellulose ester have exceptionally good flow properties and may be used in extrusion and injection molding operations. Lacquer compositions may be formulated comprising a mixture of 15–80% sucrose ester of 2,2,4-trimethyl-3-oxovaleric acid and 85–20% cellulose ester, as film former. Typical cellulose esters which may be used include cellulose acetate and cellulose nitrate as well as mixed esters including cellulose acetate butyrate and cellulose acetate propionate. These plasticized cellulose esters exhibit superior surface hardness, tensile strength at fracture, and low water absorption and solvent loss. We have also found that sucrose ester of 2,2,4-trimethyl-3-oxovaleric acid is useful as an extender for a variety of film formers in lacquer compositions. Compositions comprising a mixture of 85–20% of film former and 15–80% sucrose ester of 2,2,4-trimethyl-3-oxovaleric acid provide highly useful lacquer compositions. In the dried-down coating, there should be 5–90% sucrose ester of 2,2,4-trimethyl-3-oxovaleric acid based on the weight of film former.

The film formers and plasticizers which may be employed in compositions containing STMOV are as follows:

A group of natural resins consisting of dammars; copals including kauri, Congo and Manila; East Indian, sandarac; gum mastic; elemi gum; shellac; rosin; and synthetic resins consisting of ester gum; copal ester; phenolic resins; modified phenolic resins; alkyds; ureaformaldehydes; melamineformaldehydes; triazine resins; polyesters; maleic resins; polystyrene; polyalphamethylstyrene; polymethyl-methacrylate; and other polymers and copolymers consisting of methyl, ethyl, butyl, and isobutyl acrylates and methacrylates; cellulose acetate; cellulose triacetate; cellulose acetate propionate; cellulose acetate butyrate; cellulose tripropionate; cellulose tributyrate; cellulose tri-isobutyrate; ethyl cellulose; cellulose nitrate; chlorinated rubber; polyvinyl acetate; polyvinyl butyral; polyvinyl chloride; butadiene-styrene copolymers; butadiene acrylonitrile copolymers; epoxodized resins; polycarbonates; and silicone resins. Plasticizers which may be incorporated in compositions containing sucrose ester of 2,2,4-trimethyl-3-oxovaleric acid include esters of dibasic acids such as phthalic, maleic, succinic, sebacic, adipic, and azelaic and monobasic acids such as citric, stearic, palmitic, and phosphoric, with monohydric alcohols such as methyl, ethyl, propyl, butyl, isobutyl, etc., and with polyhydric alcohols such as glycerine, ethylene glycol, neopentyl glycol, pentaerythritol, etc.; also triacetin, tributyrin, tricresyl phosphate, triphenyl phosphate, castor oil and the like.

The following examples are intended to illustrate our invention but are not intended to limit it in any way.

*Example 1*

The following coating was prepared:

| | Percent by weight |
|---|---|
| ½ sec. nitrocellulose | 14.3 |
| STMOV | 13.8 |
| Dibutyl phthalate | 1.2 |
| Isobutylacetate | 26.5 |
| Isobutylalcohol | 7.6 |
| Ethyl alcohol | 8.3 |
| Toluene | 28.3 |

A solution of the above ingredients were made and applied to wood. The following desirable properties were obtained: high nonvolatile content at low viscosities, excellent cold check resistance, high film hardness at high modification and good permanence.

*Example 2*

| | Percent by weight |
|---|---|
| ½ sec. nitrocellulose | 16.3 |
| STMOV | 45.6 |
| Acetone | 12 |
| Ethylacetate | 25 |
| Ethyl alcohol | 1.1 |
| | 100 |

This composition produces the following desirable properties when applied to paper: high nonvolatile content with solvent economy, good adhesion, high gloss, heat sealability, and the use of a singly modifying agent.

*Example 3*

| | Percent by weight |
|---|---|
| 5 sec. nitrocellulose (70%) | 14 |
| STMOV | 19.6 |
| Dibutyl phthalate | 3.2 |
| Ethylacetate | 36 |
| Ethyl alcohol | 8 |
| Toluene | 19.2 |

When a solution of the above materials were applied to cloth, the following advantages were obtained: high degree of modification with low solution viscosity increase, good film toughness and flexibility, good low temperature and good low temperature flexibility.

*Example 4*

| | Percent by weight |
|---|---|
| ½ sec. nitrocellulose (70%) | 8.6 |
| STMOV | 14 |
| Isobutyl acetate | 38 |
| Toluene | 20 |
| Ethyl alcohol | 10 |
| Isobutyl alcohol | 4.4 |
| Ethylene glycol monoethyl ether acetate | 5 |

When the above mixture was applied to various metals, the following properties were obtained: Good adhesion to aluminum, brass, and steel surfaces, excellent resistance to water immersion, high nonvolatile content at spray viscosity, improved film hardness.

*Example 5*

| | Percent by weight |
|---|---|
| Half-second butyrate | 5 |
| STMOV | 10 |
| Toluene | 25 |
| Ethyl alcohol | 8 |
| Acetone | 35 |
| Ethyl glycol monobutyl ether | 17 |

When this composition was used, good adhesion was obtained to many plastic surfaces, both thermoplastic and thermosetting types, such as cellulose acetate, cast polyester film, polyester-fiberglas laminates, nylon, phenol formaldehyde molding compositions, etc.

*Example 6*

| | Percent by weight |
|---|---|
| ½ sec. nitrocellulose | 9 |
| STMOV | 21 |
| Toluene | 18 |
| Ethyl alcohol | 12 |
| Acetone | 28 |
| Isobutylacetate | 12 |

When a solution of the above constituents were applied to paper, high gloss and good adhesion were obtained from the solution having very high nonvolatile at low viscosity.

*Example 7*

A hot melt having the following composition was prepared and applied to paper:

| | Percent by weight |
|---|---|
| Half-second butyrate | 40 |
| STMOV | 60 |

The following properties were obtained: good flexibility, high degree of modification without a tacky surface, good adhesion, absence of fuming during processing of the melt, single component modifier for butyrate hot melts, exceptionally good heat color stability.

*Example 8*

The following were compounded into a hot melt paper coating and applied to paper at 340° F.

| | Percent by weight |
|---|---|
| Cellulose acetate butyrate | 30 |
| STMOV | 70 |

The following properties were found: excellent flexibility, good adhesion, absence of objectionable fuming during compounding, a single component modifier for the butyrate, and outstanding heat color stability.

*Example 9*

The following heat-sealing, hot melt composition was prepared:

| | Percent by weight |
|---|---|
| Half-second butyrate | 25 |
| STMOV | 70 |
| Polymeric plasticizer obtained by reacting the reaction product of neopentyl glycol and adipic acid with 2-ethylhexanol | 5 |

When applied to paper and sealed with heat the following properties were obtained: excellent flexibility, good adhesion, excellent heat sealability at low temperatures, freedom from excessive tack, and very good heat color stability.

*Example 10*

A coating composition having good adhesion, toughness, and flexibility when applied to paper, cloth, wood, and similar surfaces was made with the following composition:

| | Percent by weight |
|---|---|
| Ethyl cellulose | 15 |
| STMOV | 15 |
| Toluene | 50 |
| Ethyl alcohol | 10 |
| Ethyl acetate | 10 |

*Example 11*

The following lacquer solution was prepared:

| | Percent by weight |
|---|---|
| Chlorinated rubber (Parlon S-125) | 15 |
| Caster oil | 5 |
| STMOV | 15 |
| Toluene | 65 |

This composition produces a very tough film allowing good covering power at low viscosity.

*Example 12*

| | Percent by weight |
|---|---|
| Polymethyl methacrylate (Acryloid A-21) | 19.2 |
| STMOV | 7.5 |
| Butylbenzyl phthalate | 3.3 |
| Toluene | 50 |
| Ethyl alcohol | 12 |
| Isobutyl acetate | 8 |

The above composition produces a film having good permanence and flexibility.

*Example 13*

| | Percent by weight |
|---|---|
| Half-second butyrate | 12 |
| Polymethyl methacrylate (Acryloid A-21) | 12 |
| STMOV | 4.5 |
| Butylbenzyl phthalate | 4.2 |
| Isobutylacetate | 28 |
| Toluene | 29.3 |
| Ethyl alcohol | 10 |

When the above ingredients are applied to metals, or paper, a flexible coating having good permanence properties is produced.

*Example 14*

| | Percent by weight |
|---|---|
| Cellulose acetate | 17 |
| STMOV | 3 |
| Acetone | 40 |
| Ethyl acetate | 30 |
| Ethyl alcohol | 10 |

When the above composition is coated onto paper, a film having the desirable toughness and hardness and flexibility required by paper coatings is obtained. The STMOV permits the use of a higher nonvolatile application thus saving solvent costs.

*Example 15*

| | Percent by weight |
|---|---|
| Vinyl copolymer, 87% vinyl chloride and 13% vinyl acetate (VYHH resin) | 11 |
| STMOV | 3 |
| Dioctyl phthalate | 6 |
| Methylethyl ketone | 42 |
| Ethyl alcohol | 8 |
| Toluene | 30 |

The above composition which may be used in coating applications, or for plastic moldings without the solvent, produces higher nonvolatile solutions and increased moldability.

The above examples illustrates the versatility of the STMOV with many different types of resinous materials for application to various surfaces.

The following examples illustrate the use of STMOV for molding and plastic forming purposes. In each instance, the addition of STMOV resulted in better moldability and increased surface hardness resulting from a formulation requiring a lesser amount of an active plasticizer compared to the cellulose esters used alone or with a normal amount of plasticizer.

*Example 16*

| | Percent by weight |
|---|---|
| Cellulose acetate | 63 |
| STMOV | 25 |
| Dimethyl phthalate | 12 |

*Example 17*

| | Percent by weight |
|---|---|
| Cellulose acetate butyrate | 71 |
| STMOV | 21 |
| Dibutyl phthalate | 8 |

The preparation of STMOV is described in U.S. application Serial No. 851,496, filed November 9, 1959, in the names of Elam and Nations, and now abandoned.

STMOV when used as a plasticizer or an extender with cellulose esters or other film formers may also be co-plasticized with commercial plasticizers to give formulations with special physical properties. Such formulations may be desirable for use in such applications as recording disks, shoe heels, pen barrels, miscellaneous knobs, and coatings of various types.

In some instances, it may be desirable to add to the resinous material such as a cellulose ester, 5–100% of a plasticizer in addition to the STMOV based on the weight of the resinous material.

The invention has been described in detail with particular reference to preferred embodiments thereof, but it will be understood that variations and modifications can be effected within the spirit and scope of the invention as described hereinabove and as defined in the appended claims.

We claim:

1. An article comprising a structure having thereon a coating essentially consisting of an organic film former and 5–90% sucrose ester of 2,2,4-trimethyl-3-oxovaleric acid, based on the weight of the film former.

2. A composition of matter comprising a cellulose ester and approximately 1–400%, based on the weight of the cellulose ester, of sucrose ester of 2,2,4-trimethyl-3-oxovaleric acid.

3. A molding and extrusion composition comprising a lower fatty acid ester of cellulose and approximately 1–38.9%, based on the weight of the cellulose ester, of sucrose ester of 2,2,4-trimethyl-3-oxovaleric acid.

4. A lacquer composition comprising an organic film former and approximately 17.6–400%, based on the weight of the film former, of sucrose ester of 2,2,4-trimethyl-3-oxovaleric acid.

References Cited in the file of this patent

UNITED STATES PATENTS

| 2,525,786 | Filachione et al. | Oct. 17, 1950 |
| 2,689,799 | Albus et al. | Sept. 21, 1954 |
| 2,744,026 | Albus et al. | May 1, 1956 |
| 2,844,483 | King | July 22, 1958 |
| 2,925,352 | Lowe | Feb. 16, 1960 |
| 2,931,802 | Touey et al. | Apr. 5, 1960 |